US009097313B2

(12) United States Patent
Wilkinson et al.

(10) Patent No.: US 9,097,313 B2
(45) Date of Patent: Aug. 4, 2015

(54) CLEANER HEAD FOR A CLEANING APPLIANCE

(71) Applicant: Dyson Technology Limited, Wiltshire (GB)

(72) Inventors: Craig Thomas Wilkinson, Malmesbury (GB); Martin Szymon Gutkowski, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 361 days.

(21) Appl. No.: 13/750,240

(22) Filed: Jan. 25, 2013

(65) Prior Publication Data

US 2013/0196802 A1 Aug. 1, 2013

(30) Foreign Application Priority Data

Jan. 27, 2012 (GB) .................................. 1201373.6

(51) Int. Cl.
  *F16H 7/10* (2006.01)
  *A47L 9/04* (2006.01)
(52) U.S. Cl.
  CPC ................ *F16H 7/10* (2013.01); *A47L 9/0411* (2013.01); *A47L 9/0444* (2013.01); *A47L 9/0455* (2013.01)
(58) Field of Classification Search
  CPC ....... F16H 7/10; A47L 9/2842; A47L 9/2857; A47L 9/0411; A47L 9/0444; A47L 9/0455
  USPC .................................................. 15/319, 339
  See application file for complete search history.

(56) References Cited

U.S. PATENT DOCUMENTS

| 4,648,150 | A | * | 3/1987 | Morishita et al. ................ 15/389 |
| 4,976,003 | A | | 12/1990 | Williams |
| 8,528,158 | B2 | * | 9/2013 | Maguire et al. .................. 15/319 |
| 2004/0231095 | A1 | | 11/2004 | Nam et al. |

(Continued)

FOREIGN PATENT DOCUMENTS

| CN | 101182874 | 5/2008 |
| CN | 102306974 | 1/2012 |

(Continued)

OTHER PUBLICATIONS

Search Report dated Apr. 27, 2012, directed towards GB Application No. 1201373.6; 1 page.

(Continued)

*Primary Examiner* — Dung Van Nguyen
(74) *Attorney, Agent, or Firm* — Morrison & Foerster LLP (57) ABSTRACT

A cleaner head includes a drive mechanism connecting a drive means to a rotatable brush member. The drive mechanism comprises an input drive member connected to the drive means, an output drive member connected to the rotatable brush member, and a flexible drive element extending therebetween. The drive mechanism is provided with an adjustment mechanism operable to vary the distance between the input and output drive members in order to vary the tension of the flexible drive element. The adjustment mechanism is movable in a first direction from a first position in which the flexible drive element has a relatively low tension through a plurality of further positions which increases the tension in the flexible drive element. The adjustment mechanism is lockable in a selected one of the plurality of further positions against movement in a direction opposite to the first direction.

17 Claims, 6 Drawing Sheets

(56) References Cited

U.S. PATENT DOCUMENTS

2007/0056137 A1* 3/2007 Miner et al. .................. 15/390
2007/0234505 A1* 10/2007 Gordon et al. ................. 15/354

FOREIGN PATENT DOCUMENTS

| | | |
|---|---|---|
| GB | 2462123 | 1/2010 |
| GB | 2469453 | 10/2010 |
| JP | 1-164342 | 6/1989 |
| JP | 2002-330907 | 11/2002 |
| JP | 2010-148661 | 7/2010 |

OTHER PUBLICATIONS

Search Report dated Aug. 23, 2012, directed towards GB Application No. 1201373.6; 1 page.

Search Report and Written Opinion mailed Mar. 6, 2013, directed to International Application No. PCT/GB2012/053231; 14 pages.

* cited by examiner

CLEANER HEAD FOR A CLEANING APPLIANCE

REFERENCE TO RELATED APPLICATIONS

This application claims the priority of United Kingdom Application No. 1201373.6, filed Jan. 27, 2012, the entire contents of which are incorporated herein by reference.

FIELD OF THE INVENTION

The invention relates to a cleaner head for a cleaning appliance, and preferably a vacuum cleaning appliance. The invention also relates to a drive mechanism for use in such a cleaner head.

BACKGROUND OF THE INVENTION

Cleaner heads for vacuum cleaners are known to include a rotatable brush bar that operates to beat dirt and dust from textured floor coverings and the surfaces of furniture. Such a cleaner head performs particularly well at removing fibrous matter such as animal hair from textile floor or furniture coverings.

In such a cleaner head equipped with a brush bar, the brush bar may be driven either by an electric motor or by an air turbine which is powered by the flow of air through the cleaner head during use. Whether driven by either an electric motor or air turbine, it is common to transmit rotary power from the drive unit to the brush bar by a drive belt mechanism. An example of such a drive belt mechanism is shown in U.S. Pat. No. 4,976,003.

In such a drive belt arrangement, power from an input drive member is transmitted to an output drive member by a flexible toothed drive belt. The input and output drive members have parallel axes and the distance between the two members is fixed. Such an arrangement is known as a fixed centre drive, and is commonly used in production applications since they are relatively simple and cost-efficient.

In order for a fixed centre drive to operate reliably, the drive belt must be tensioned precisely. However, the accumulation of tolerances on the components of the drive mechanism can cause the drive belt, when assembled, to fall outside the relatively narrow range of acceptable tension values. This can be a problem since too high a belt tension can cause reduced component life in addition to causing assembly difficulties, whereas too low a belt tension can also prematurely wear the belt and the pulleys, as well as increasing the risk that the belt may slip. It is against this background that the invention has been devised.

SUMMARY OF THE INVENTION

In a first aspect the invention provides a cleaner head for a cleaning appliance comprising a rotatable brush member, drive means for driving the rotatable brush member, a drive mechanism connecting the drive means to the rotatable brush member. The drive mechanism comprises an input drive member connected to the drive means, an output drive member connected to the rotatable brush member, a flexible drive element extending between the input drive member and the output drive member, wherein the input drive member and the output drive member are movable with respect to each other in a plane that is substantially orthogonal to their respective axes of rotation. The cleaner head further includes an adjustment mechanism operable to vary the distance between the input and output drive members in order to vary the tension of the flexible drive element, wherein the adjustment mechanism is movable in a first direction from a first position in which the flexible drive element has a relatively low tension through a plurality of further positions which increases the tension in the flexible drive element wherein the adjustment mechanism is lockable in a selected one of the plurality of further positions against movement in a direction opposite to the first direction.

The adjustment mechanism may be non-returnably lockable in any one of the plurality of further positions by way of a ratchet formation.

In order permit movement between the input and output drive members, the input drive member may be associated with a first housing portion and the output drive member may associated with a second housing portion, wherein the second housing portion is movable with respect to the first housing portion.

Although the relative spacing between the two housing portions may be achieved in many ways, for example by cooperating wedge members, in a preferred embodiment the adjustment mechanism includes a cam member rotatably coupled to one of the first or second housing portions, and a cam abutment member provided on the other of the first and second housing portions and being engageable with the cam member such that angular movement of the cam member about its rotational axis in a first direction increases the distance of the input drive member and the output drive member. Such an arrangement is particularly beneficial because the point of contact between the cam member and its abutment member or 'follower' remains constant and, preferably, is situated along an axis between the input and output drive members. This avoids any undesirable forces being exerted on the cam member, in use.

So that the rotatable cam member can be secured to the housing when the desired tension in the flexible drive element has been attained, the cam member may be carried on an axle that is radially expandable, for example by a screw driven into the centre of the axle after the cam member has been rotated to a desired position.

The flexible drive element may take many forms but, in an exemplary embodiment, is a polymeric belt. Similarly, although the drive means may take many forms, such as a hydraulic or pneumatic drive, in the exemplary embodiment the drive means is an electrically driven motor.

The drive mechanism finds particular use in a cleaner head in a vacuum cleaner, but it is envisaged that the drive mechanism will also find use in other applications. Thus, in a second aspect the invention resides in a drive mechanism comprising an input drive member rotatably coupled to a drive motor, a rotatable output drive member, a flexible drive element extending between the input drive member and the output drive member to transmit power therebetween, wherein the input drive member and the output drive member are movable with respect to each other in a plane that is substantially orthogonal to their respective axes of rotation, wherein an adjustment mechanism is movable in a first direction from a first position in which the flexible drive element has a relatively low tension through a plurality of further positions which increases the tension in the flexible drive element wherein the adjustment mechanism is lockable in a selected one of the plurality of further positions against movement in a direction opposite to the first direction. It should be appreciated that preferred and/or optional aspects of the first invention may be combined with the second aspect.

In a third aspect, the invention provides a method of tensioning a flexible drive member in a cleaner head for a vacuum cleaner, the method comprising the step of assembling a drive mechanism for driving a rotatable component of the vacuum cleaner including an input drive member connected to a drive means and an output drive member coupled to the rotating component, and a flexible drive element extending between the input drive member and the output drive member, wherein the input drive member and the output drive member are movable with respect to each other in a plane that is substantially orthogonal to their respective axes of rotation, providing a cam member that is operable to vary the distance along the axis between the input and output drive members, rotating the cam member to increase the distance between the input and output drive members, wherein the cam member is rotated with a predetermined torque so as to induce a predetermined tension in the flexible drive member.

The cam member may be locked in position after it has been rotated with a predetermined torque.

BRIEF DESCRIPTION OF THE DRAWINGS

So that it may be more readily understood, embodiments of the present invention will now be described, by way of example only, with reference to the accompanying drawings, in which.

DETAILED DESCRIPTION OF THE INVENTION

Figure 1:
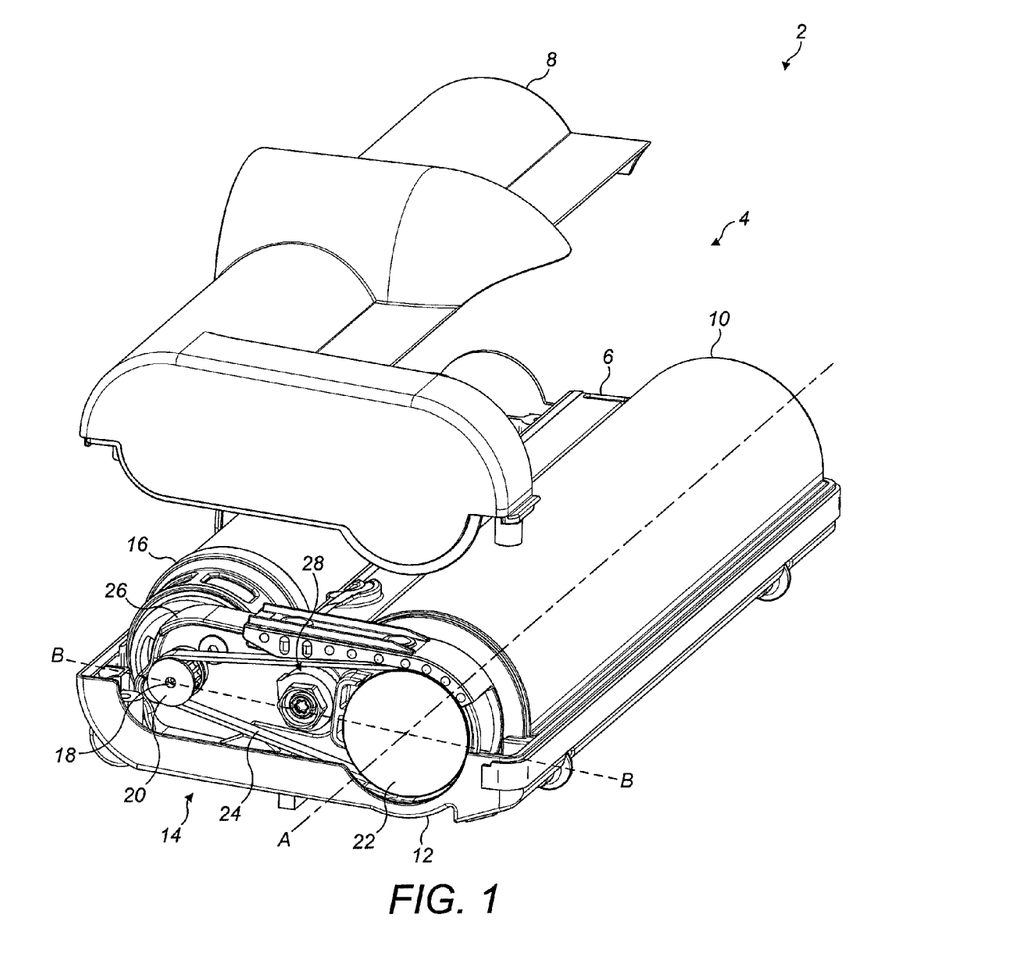
FIG. 1 is a perspective view of a cleaner head of the invention, shown partially exploded for clarity.

With reference to FIG. 1, a cleaner head 2 for a vacuum cleaner comprises a two-part outer housing 4 that divides laterally into a lower housing portion 6 and an upper housing portion 8. The lower and upper housing portions 6, 8 are shown split apart in FIG. 1 so that the interior of the cleaner head 2 can be seen.

A forward portion of the cleaner head 2 includes a brush bar housing 10 within which a rotatable brush bar (not shown) is mounted so as to be rotatable about a first axis 'A'. The brush bar housing 10 is generally cylindrical and includes a generally rectangular opening 12 on the underside of the cleaner head 2 through which brush elements of the brush bar extend in order to beat dirt and dust from an adjacent surface, in use. Suitable brush bars are well known in the art and the exact form of brush bar is not essential to the invention so will not be described in further detail here.

The brush bar 2 is driven by a drive mechanism, indicated generally as 14. The drive mechanism 14 includes a drive means 16 which in this embodiment is in the form of an electric motor having a drive shaft 18 to which is coupled a rotatable input drive member 20 in the form of a wheel, or pulley, which is shown with teeth in FIG. 3 although this is optional. A rotatable output drive member 22 is coupled to a drive shaft 18 of the brush bar and power is transmitted from the drive motor 16 to the brush bar by a flexible drive element 24 in the form of a toothed belt. A housing 26 surrounds and contains the input drive member 20, the output drive member 22 and the drive belt 24. The skilled person will appreciate that many forms of drive belt are available in the art and so a toothed belt is not essential to the invention. A V-belt is also a viable alternative. Furthermore, a drive chain is an alternative form of flexible drive element.

The drive mechanism 14 takes the form of a fixed centre drive in which the axial positions of the input drive member 20 and the output drive member 22 are fixed at the time of assembly. In order to allow the drive belt 24 to be accurately and precisely pre-tensioned, the drive mechanism 14 is provided with an adjustment mechanism, indicated generally at 28.

Figure 2:
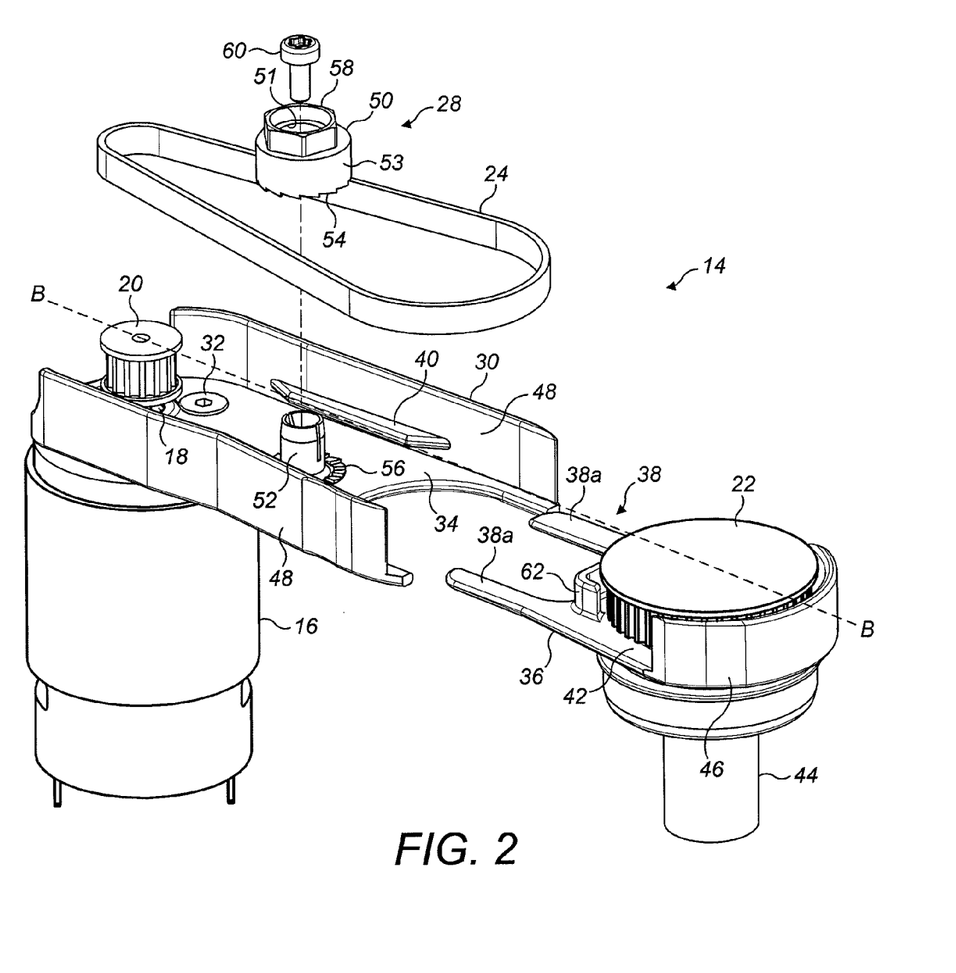
FIG. 2 is a perspective view of a drive mechanism of the cleaner head in FIG. 1, but shown in a substantially unassembled condition.
Figure 3:
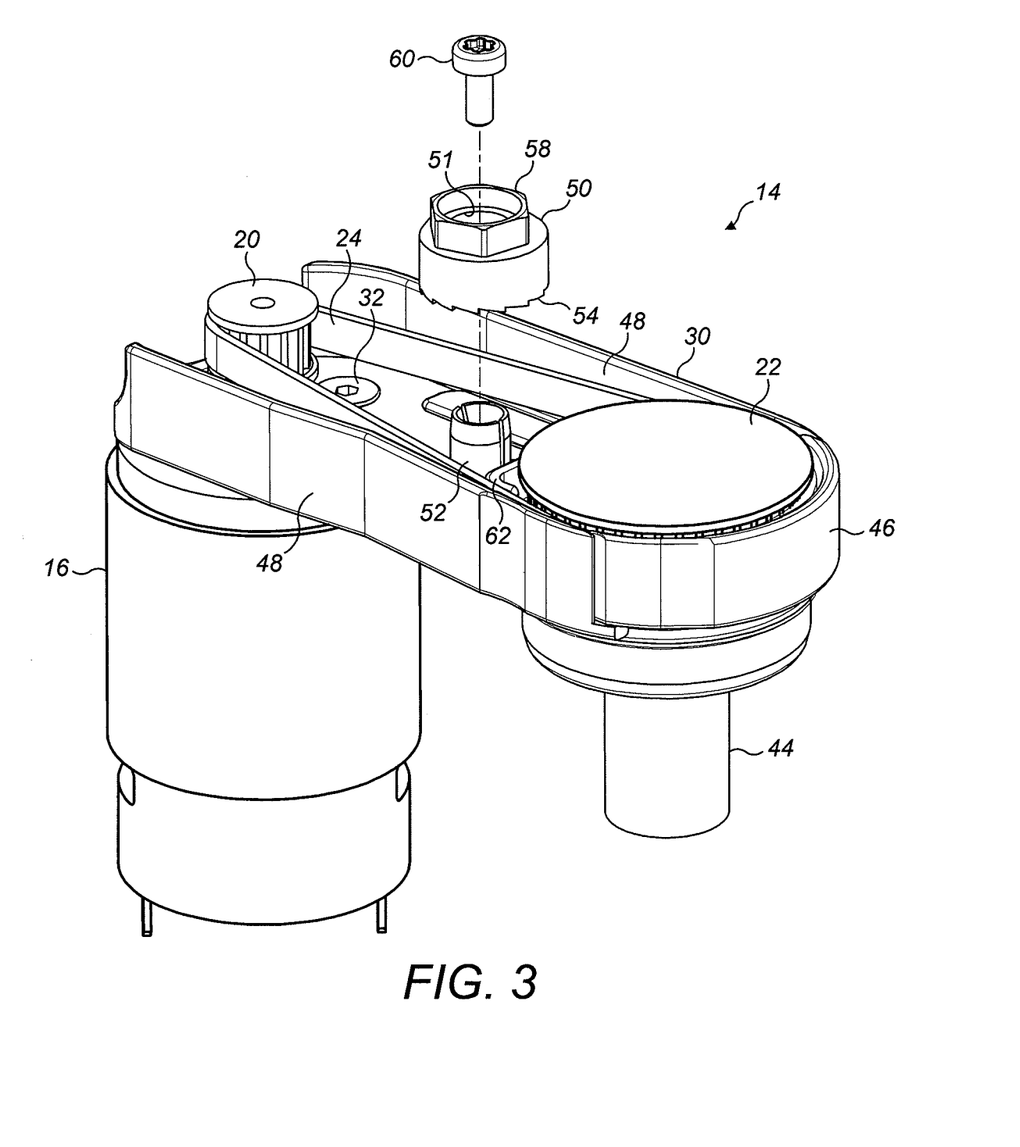
FIG. 3 is a perspective view, like FIG. 2, with the drive mechanism shown partly assembled.
Figure 4:
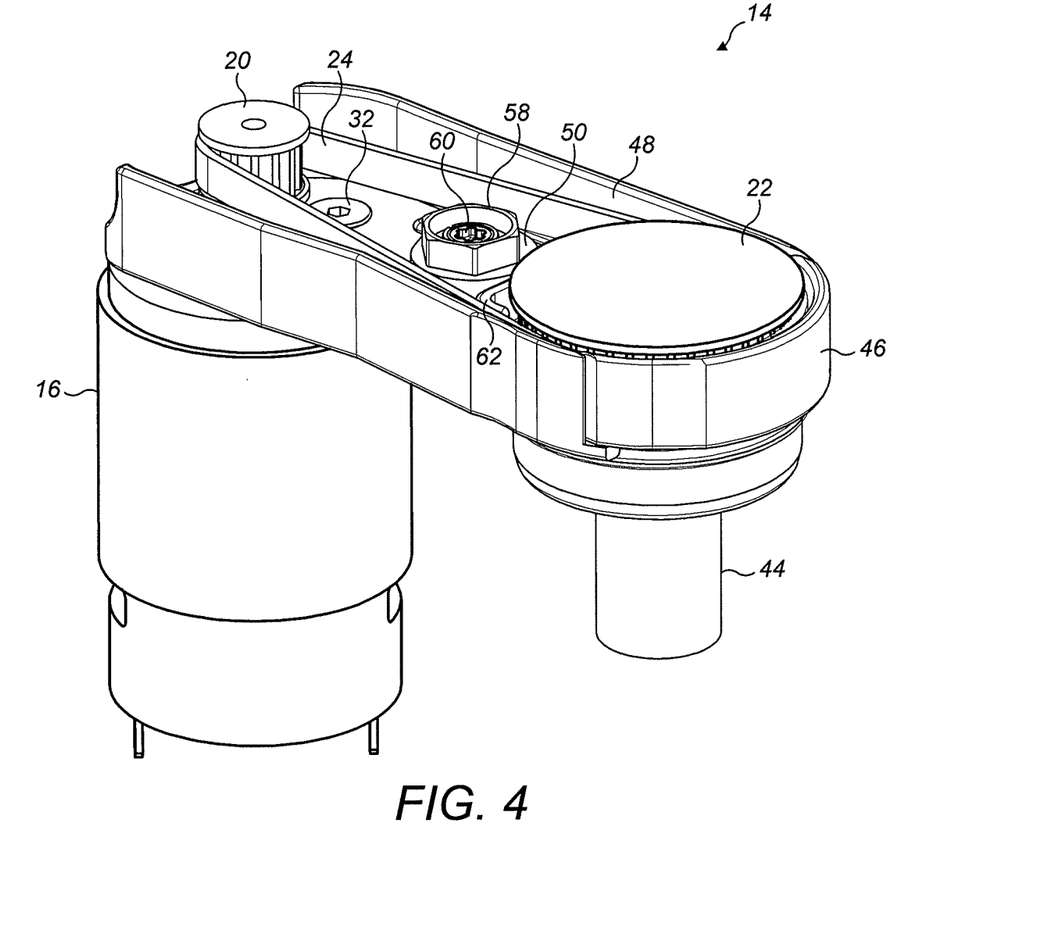
FIG. 4 is a perspective view, like FIG. 2, with the drive mechanism shown fully assembled.

Referring now to FIGS. 2, 3 and 4, the drive mechanism 14 is shown in three stages of assembly. As can be seen the drive housing 26 comprises two sections which are movable relative to one another. In more detail, the drive housing 26 includes a first housing portion 30 that is channel-shaped in cross section and that is fixed at one end to a face of the drive motor 16 by screw fasteners 32 (only one of which is shown in FIG. 2), although other fastening means may be used such as clips or an adhesive. The drive shaft 18 of the motor 16 extends through an aperture (not shown) defined in a floor surface 34 of the first housing portion 30 and to which the drive pulley 20 is affixed. The pulley 20 may be attached to the drive shaft 18 by way of a press fit or alternatively, or in addition, a fixing agent such as adhesive or even weld may be used to bond the pulley 20 to the shaft 18.

The drive housing 26 also includes a second housing portion 36 that is shown in FIG. 3 aligned with but spaced from the first housing portion 30 along the axis B. The second housing portion 36 has a first end that defines an engagement fork 38 having a pair of spaced parallel arms 38a that are dimensioned so as to be able to fit within the channel defined by the first housing portion 30 and to slide along the direction of the axis B. The arms 38a are slidable under a set of guide ribs 40 provided on upstanding side wall portions 48 of the first housing portion 30 so that the second housing portion 36 is prevented from separating from the first housing portion 30 in a direction normal to the sliding axis B. The other end of the second housing portion defines a mounting boss 42 for the output drive member 22 that, in this embodiment, is also in the form of a toothed wheel or pulley. A drive dog 44 extends from one side of the output pulley 22 through the mounting boss 42 of the second housing portion 36 for engagement with the brush bar of the when the drive mechanism 14 is position within the cleaner head 2. In this embodiment, the drive dog 44 is shown as a cylindrical projection, although it should be noted that a gripping formation could be provided if desired, such as splines, in order better to engage the brush bar.

In order to protect the output pulley 22 and the drive belt 24 from being fouled by debris, an upstanding curved wall 46 enshrouds a side portion of the output pulley 22 remote from the motor 16. When the two housing portions 30, 36 are assembled, the upstanding wall 46 on the second housing portion 36 is complemented by the adjacent upstanding wall portions 48 of the first housing member 30 to provide a substantially continuous protective screen for the output pulley 22 and the drive belt 24, as can be seen particularly clearly in FIG. 3, in which the second housing portion 36 is shown engaged with the first housing portion 30 and the drive belt 24 is shown assembled onto the input and output drive pulleys 20, 22.

It will be appreciated that the second housing portion 36 and, therefore, the output drive pulley 22 are movable towards and away from the input drive pulley 20. This provides a means by which the tension in the drive belt 24 may be set precisely and accurately during assembly which is achieved by the adjustment mechanism 28, and as will now be described.

The adjustment mechanism 28 includes a rotatable cam member 50 that has a central aperture 51 which is receivable on a split spigot axle 52 upstanding from a centre region of the floor surface 34 of the first housing portion 30. Such a cam member 50 is sometimes referred to as a 'snail cam' in the art. The cam member 50 has a serrated annular lower surface 54 which is engageable with a complementary shaped serrated region 56 of the floor surface 34 of the first housing portion 30 that encircles the base of the spigot axle 52. Therefore, when the cam member 50 is received on the spigot axle 52, it may rotate in a clockwise direction, but is prevented from rotating anticlockwise due to the ratchet formation defined by the adjacent surfaces of the cam member 50 and the first housing portion 30. Such a ratchet formation provides an efficient and convenient 'non-return' means in order that the cam member may be rotated in one direction but prevented from rotating in the opposite direction which, in this specific embodiment, is anticlockwise. It is envisaged that a ratchet formation may not be essential in all applications to prevent an undesirable rotation of the cam member and that instead of complementary serrated regions, a high friction surface, somehow roughened for example, could also function adequately. However, serrations are currently preferred because of the positive lock they provide against returning movement.

The upper face of the cam member 50 includes a head formation 58 so that it may be engaged and rotated by a suitable tool, as will be described. It should be noted that the head formation 58 is hexagonal, although other formations are also acceptable. The cam member 50 is retained on the spigot axle 52 by a suitable fastening means in the form of a screw 60 which, as shown in FIGS. 2 and 3, extends through the central aperture 51 of the cam member 50 and into the spigot axle 52. The screw is tightened into the spigot which causes the spigot to flare outwardly thereby holding the cam member 50 securely on the spigot axle 52 and also locking the cam member 50 securely against further rotational movement. The drive mechanism 28 is shown fully assembled in FIG. 4.

When the cam member 50 is assembled on the spigot axle 52, its cam surface 53 engages a cam abutment member 62 or 'follower' in the form of an upstanding wall that extends transversely at least partially across the width of the second housing portion 36 adjacent the output pulley 22. The cam member 50 therefore bears against the follower 62 such that rotational movement of the cam member 50 varies the separation between the input drive pulley 20 and the output drive pulley 22.

Figure 5A:
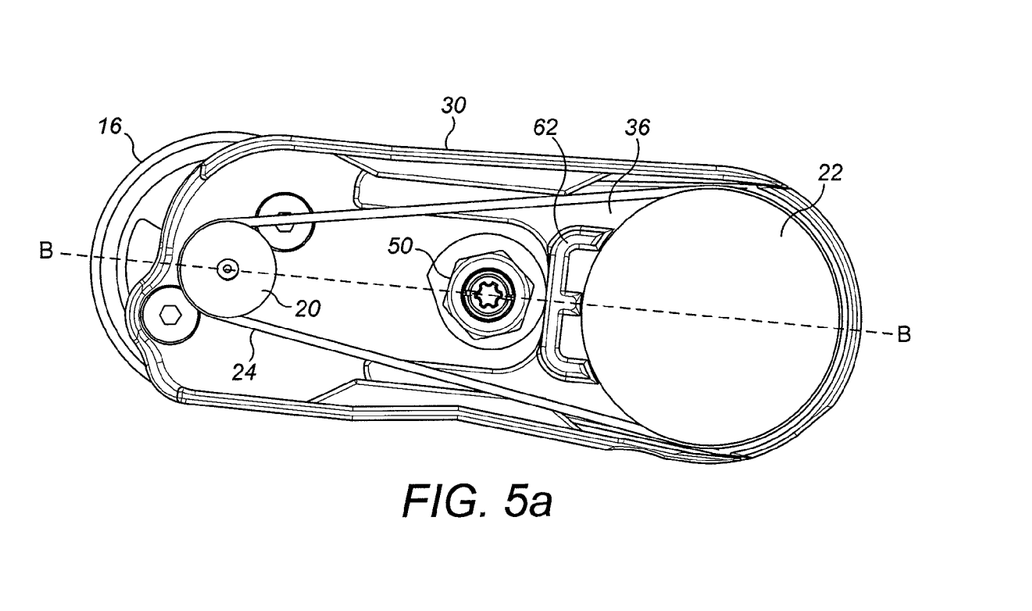
FIG. 5a is a plan view of the drive mechanism shown in an untensioned state.
Figure 5B:
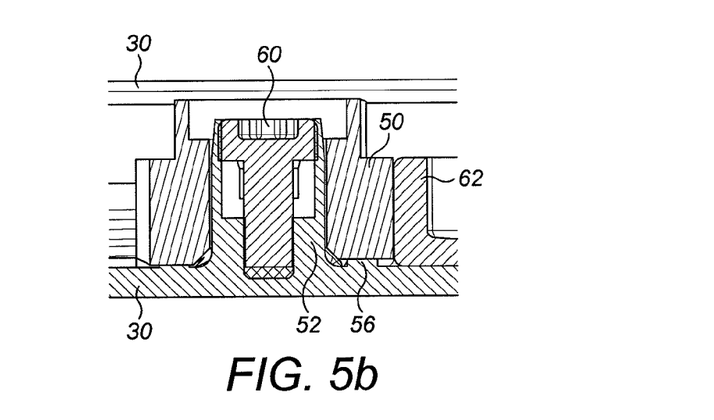
FIG. 5b is a cross section through the line A-A.
Figure 6:
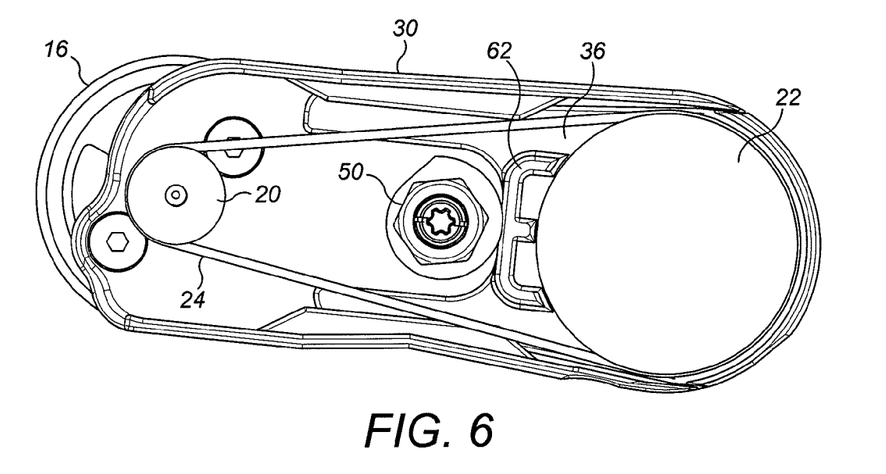
FIG. 6 is a plan view, like FIG. 5a, but with the drive mechanism shown in a pre-tensioned state.

FIGS. 5a and 5b shown the drive mechanism 14 fully assembled and in an initial condition (FIG. 5a) in which the cam member 50 is at an angular position such that the follower 62 engages a portion of the base circle of the cam member 50, and in a further condition (FIG. 5b) in which the cam member 50 is has been turned in a clockwise direction so that the cam follower 62 abuts a raised portion of the cam profile 53. In the condition shown in FIG. 5a, the separation between the input and output drive members will be such that the tension in the drive belt 24 will be relatively low. In order to set a predetermined tension in the drive belt 24, the cam member 50 is rotated in a clockwise direction such that the cam follower 62 rides along the rising cam profile surface 53 of the cam member 50, therefore increasing the separation of the second housing portion 36 from the first housing portion 30, as shown in FIG. 5b. The cam member 50 is rotated until the tension in the drive belt 24 reaches a predetermined value. It will be appreciated that the exact value of pre-tension in the drive belt 24 will be specific to the application that the drive mechanism 14 is to be used. It should be noted that it is possible to measure the tension in the drive belt 24 via the deflection of the belt. However, a more convenient technique is to calibrate the torque necessary to rotate the cam member 50 against the resultant tension in the drive belt 24. In order to achieve this, the cam member 50 is rotatable with a suitable torque driving device, such as a slipping torque driver, or 'click-type' torque wrench, that is calibrated so that the driver slips when a torque value is reached that achieves a predetermined pre-tension in the drive belt 24.

It should be noted that the point of contact between the snail cam member 50 and the cam follower 62 does not move as the cam member 50 rotates and is substantially aligned with the axis B extending between the centres of the input and output pulleys. Advantageously therefore the line of force remains directly through the cam member and the two pulleys thereby providing no external torque to the cam which makes the cam arrangement extremely robust to backlash, for example, that may be experienced by the drive mechanism.

As the cam member 50 is rotated in the clockwise direction, it ratchets along the serrated surface 56 of the first housing portion 30 so that the angular position of the cam member 50 is fixed when the predetermined torque is reached. The torque-tightening device can therefore be disengaged from the cam member 50 without risk of the cam member 50 slipping back and de-tensioning the drive belt 24. The cam member 50 then can be finally secured by engaging the screw fastener 62 into the spigot axle 52. As a result of this assembly process, the adjustment mechanism 28 enables the tolerances in the individual components of the drive mechanism 14 to be compensated so that the drive belt 24 can be pre-tensioned accurately and precisely to a required setting. The drive mechanism 14 thus becomes a fixed centre drive with improved reliability since the drive belt 24 is optimally tensioned and the input and output drive pulleys 20, 22 are not movable relative to each other in use.

Figure 7:
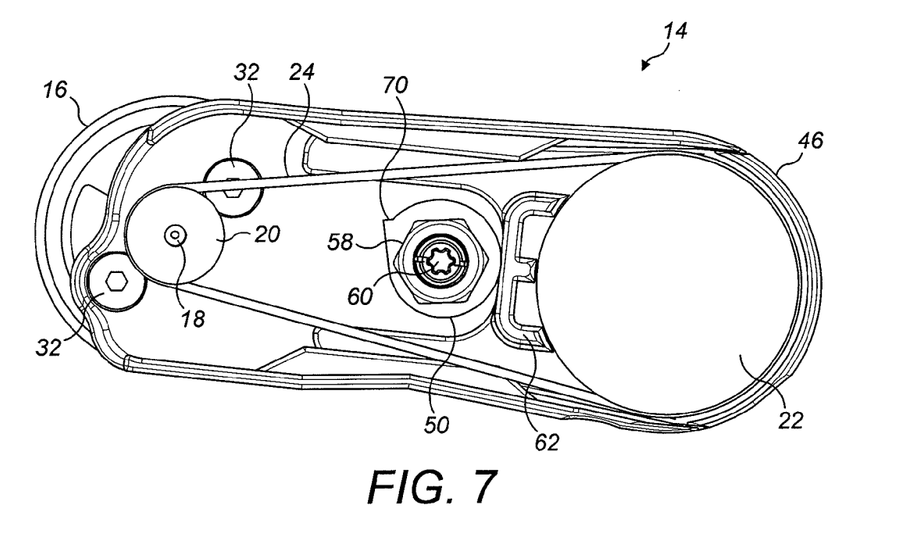
FIG. 7 is a plan view of a drive mechanism of an alternative embodiment of the invention.

Variants of the cam member are envisaged. For example, an alternative embodiment of a drive mechanism described above is shown in FIG. 7, in which like parts are denoted with the same reference numerals. In this embodiment, the outer cam surface profile of the cam member 50 is shaped to define a stop element 70 in the form of a step or lip that stands proud from the adjacent portion of the cam surface profile. This lip 70 delimits the maximum angular rotation that the cam member 50 can make in the clockwise direction since further clockwise rotation of the cam member will be prevented when the step 70 makes contact with the cam follower member 62. This is a useful aid to the belt tensioning process as it prevents the cam member from being rotated past its maximum 'lift' and therefore dropping down to a minimum lift value.

Some variations to the specific embodiment have already been described. Others will now be explained below.

The skilled person will appreciate that although the embodiment described above includes an electric motor, this is not essential to the invention and any drive means could provide power to the input drive shaft. For example, the electric motor could be substituted by an air turbine which is driven by airflow through the cleaner head. A hydraulic drive is a further alternative. Also, it should be noted that the cleaner head could be used with a cylinder-type vacuum cleaner and so be coupled to the vacuum cleaner by a wand and hose assembly. It could also be used with an upright-type or a stick-type vacuum cleaner in which case the cleaner head would be coupled or incorporated into a base portion of the cleaner.

The adjustment mechanism has been described as comprising a cam member provided on the first housing portion and a cam abutment member or follower provided on the second housing portion. However, other configurations are envisaged and instead the cam follower could be provided on the first housing portion that is associated with the input drive member. Furthermore, although it has been described that the first and second housing portions are movable linearly towards and away from each other by virtue of the engagement of the arms 38a of the second housing portion with the guide ribs 30 of the first housing portions, it should be noted that other arrangements for allowing relative movement between the first and second housing portions are envisaged. For example, the first and second housing portions could be joined so that they are movable angularly with respect to one another.

Although the input drive pulley 20 is shown as having a smaller diameter than the output drive pulley 22, it will be appreciated that this is simply due to the requirement to gear-down the rotational speed of the drive shaft to a more suitable speed for the brush bar. Needless to say, it is not essential to the invention that the output pulley 22 has a larger diameter than the input pulley 20.

The invention claimed is:

1. A cleaner head for a cleaning appliance comprising:
a rotatable brush member;
a drive unit for driving the rotatable brush member;
a drive mechanism connecting the drive unit to the rotatable brush member, the drive mechanism comprising:
an input drive member connected to the drive unit;
an output drive member connected to the rotatable brush member;
a flexible drive element extending between the input drive member and the output drive member;
wherein the input drive member and the output drive member are movable with respect to each other in a plane that is substantially orthogonal to their respective axes of rotation,
and wherein an adjustment mechanism is operable to vary the distance between the input and output drive members in order to vary the tension of the flexible drive element, wherein the adjustment mechanism is movable in a first direction from a first position in which the flexible drive element has a relatively low tension through a plurality of further positions which increases the tension in the flexible drive element, wherein the adjustment mechanism is lockable in a selected one of the plurality of further positions against movement in a direction opposite to the first direction.

2. The cleaner head of claim 1, wherein the adjustment mechanism includes a ratchet formation which is operable to lock the adjustment mechanism in said plurality of further positions.

3. The cleaner head of claim 1, wherein the input drive member is associated with a first housing portion and the output drive member is associated with a second housing portion, wherein the second housing portion is movable with respect to the first housing portion.

4. The cleaner head of claim 3, wherein the adjustment mechanism includes a cam member rotatably coupled to one of the first or second housing portions, and a cam abutment member provided on the other of the first and second housing portions and being engageable with the cam member such that angular movement of the cam member about its rotational axis in a first direction increases the distance of the input drive member and the output drive member.

5. The cleaner head of claim 4, wherein the rotatable cam member is carried on a radially expandable axle.

6. The cleaner head of claim 4, wherein the cam member is provided with a stop element to limit the range of angular rotation thereof.

7. The cleaner head of claim 1, wherein the flexible drive element is a belt.

8. The cleaner head of claim 1, wherein the drive unit is an electric motor.

9. A method of tensioning a flexible drive member in a cleaner head for a vacuum cleaner comprising,
assembling a drive mechanism for driving a rotatable component of the vacuum cleaner including an input drive member connected to a drive unit and an output drive member coupled to the rotating component, and a flexible drive element extending between the input drive member and the output drive member, wherein the input drive member and the output drive member are movable with respect to each other in a plane that is substantially orthogonal to their respective axes of rotation;
providing a cam member that is operable to vary the distance along the axis between the input and output drive members, and
rotating the cam member to increase the distance between the input and output drive members, wherein the cam member is rotated with a predetermined torque so as to induce a predetermined tension in the flexible drive member.

10. The method of claim 8, wherein the cam member is locked in position after it has been rotated with the predetermined torque.

11. A drive mechanism comprising an input drive member rotatably coupled to a drive motor, a rotatable output drive member, a flexible drive element extending between the input drive member and the output drive member to transmit power therebetween, wherein the input drive member and the output drive member are movable with respect to each other in a plane that is substantially orthogonal to their respective axes of rotation, wherein the adjustment mechanism is movable in a first direction from a first position in which the flexible drive element has a relatively low tension through a plurality of further positions which increases the tension in the flexible drive element, wherein the adjustment mechanism is lockable in a selected one of the plurality of further positions against movement in a direction opposite to the first direction.

12. The drive mechanism of claim 11, wherein the adjustment mechanism includes a ratchet formation which is operable to lock the adjustment mechanism in said plurality of further positions.

13. The drive belt mechanism of claim 11, wherein the input drive member is associated with a first housing portion and the output drive member is associated with a second housing portion, wherein the second housing portion is movable with respect to the first housing portion in said plane.

14. The drive mechanism of claim 13, wherein the adjustment mechanism includes a cam member rotatably coupled to one of the first or second housing portions, the cam member being engagable with a cam follower provided on the other of the first or second housing portions such that angular movement of the cam member about its rotational axis in a first direction increases the distance of the input drive member and the output drive member.

15. The drive mechanism of claim 14, wherein the rotatable cam member is carried on a radially expandable axle.

16. The drive mechanism of claim 14, wherein the rotatable cam member includes a cam surface having a stop element to delimit the range of angular movement in the first direction.

17. The drive mechanism of claim 11, wherein the flexible drive element is a belt.

* * * * *